(12) United States Patent
Crohn et al.

(10) Patent No.: US 6,422,600 B1
(45) Date of Patent: Jul. 23, 2002

(54) AIRBAG MODULE

(75) Inventors: Detlef Crohn; Thomas Siegmund, both of Berlin; Wilhelm Schnabel, Niedernberg, all of (DE)

(73) Assignee: Takata-Petri AG (DE)

( * ) Notice: Subject to any disclaimer, the term of this patent is extended or adjusted under 35 U.S.C. 154(b) by 0 days.

(21) Appl. No.: 09/787,274

(22) PCT Filed: Aug. 3, 1999

(86) PCT No.: PCT/DE99/02430
§ 371 (c)(1),
(2), (4) Date: May 24, 2001

(87) PCT Pub. No.: WO00/15473
PCT Pub. Date: Mar. 23, 2000

(30) Foreign Application Priority Data

Sep. 15, 1998 (DE) .......................................... 198 43 191

(51) Int. Cl.$^7$ ............................................... B60R 21/26
(52) U.S. Cl. ......................... 280/740; 280/736; 280/742
(58) Field of Search ................................ 280/736, 740, 280/741, 742, 731

(56) References Cited

U.S. PATENT DOCUMENTS 6,109,649 A  * 8/2000 Adomeit et al. ............ 280/741

FOREIGN PATENT DOCUMENTS

| DE | 25 47 724 | 5/1976 |
| DE | 296 05 585 | 1/1997 |
| DE | 296 14 586 | 2/1997 |
| DE | 44 42 202 | 5/1997 |
| DE | 196 42 694 | 4/1998 |
| DE | 196 45 373 | 4/1998 |
| DE | 298 05 217 | 10/1998 |
| EP | 0 773 142 | 5/1997 |
| EP | 0 827 875 | 3/1998 |
| GB | 2 290 267 | 12/1995 |
| WO | WO 96/25 309 | 8/1996 |

* cited by examiner

*Primary Examiner*—Eric Culbreth
(74) *Attorney, Agent, or Firm*—Foley & Lardner

(57) ABSTRACT

The invention relates to an airbag module comprising a gas generator, diffuser and a gas bag. The invention is characterized in that the gas generator (5) is arranged in a diffuser (1) or housing of the gas generator with a stepped structure when seen in a longitudinal section. The diffuser (1) or the housing of the gas generator extends in the lower region of the side wall (2) at a distance from the gas generator (5). The lower region of the side wall (2) extends beyond the gas generator (5) in the direction of the occupant. The diffuser (1) or the housing of the gas generator (5) has a smaller cross-section than the gas generator (5). Openings (6,16) through which the gas from the gas generator flows into the gas bag (10) are arranged in a perpendicular position to the occupant. The upper (4) and lower (2) regions of the side wall are connected to each other by at least one deformable center area (3) of the side wall. One advantage provided by the inventive device is that the section of the diffuser that is located above the gas generator can, by virtue of its deformable center area, be moved out of the way of an occupant colliding therewith, thereby reducing the risk of injury.

26 Claims, 5 Drawing Sheets

AIRBAG MODULE

DESCRIPTION

The invention relates to an airbag module.

From WO 96/25 309 an airbag module is known in which a diffuser is mounted above a gas generator and has a smaller cross-sectional surface area than the gas generator. The gas bag of the airbag module extends in the folded state mainly at the side of the diffuser and above the diffuser there is only one layer of the gas bag. The diffuser has outlet openings mainly at the side, i.e. in a direction extending transversely to the seat occupant.

The drawback with this arrangement is that the diffuser represents a source of danger for the occupant should he strike against the diffuser if the gas bag does not open or if the gas bag has already collapsed.

From EP 0 827 875 a steering wheel is known having a gas bag restraint system where the gas generator is mounted in a pot-shaped deformation element which lies with its base above the gas generator. Openings to allow the gases of the gas generator to flow out into the gas bag are provided in the base and at the sides of the deformation element. The deformation element thus likewise represents a diffuser. The gas bag extends in the folded state mainly at the side of this deformation element and only one layer of the gas bag lies above same.

The drawback with this arrangement is that owing to the outflow opening located in the base there is the tendency for the gas bag to unfold directly in the direction of the occupant which has a negative effect on an out of position occupant. Furthermore there is no stowage space available for the gas bag above the gas generator owing to the side wall of the deformation element being only slightly inclined there towards the axis of the gas generator. This is particularly disadvantageous in a steering wheel on account of the small space available for the airbag.

The patent specification EP 0 773 142 A1 describes an airbag module with a gas bag, a gas generator and a diffuser which encloses the gas generator and has a number of perforations over the entire diffuser body. The diffuser can hereby absorb the energy of an occupant striking against same. The drawback however is that the entire diffuser body is provided with perforations which represents an expensive solution. In addition the arrangement known from EP 0 773 142 A1 has the disadvantage that there is little stowage space for the folded gas bag and the gas bag unfolds immediately in the direction of the vehicle occupant during deployment.

The object of the invention is to design the airbag module so that it is formed at least in part in simple manner as a deformation element where stowage space for the folded gas bag is provided above the gas generator and where in the first phase the gas bag unfolds mainly transversely to the occupant.

According to this the diffuser or the housing has in the longitudinal section a stepped construction with a lower side wall area, an upper side wall area and a central side wall area connecting the upper and lower side wall areas. The diffuser or the housing extends in a lower side wall area at a distance from the gas generator and beyond the gas generator in the direction of the tear-open area of the module cover and thereby encloses at least approximately the same cross-sectional area as its section lying next to the gas generator. In this area the cross section of the diffuser or housing of the gas generator is thus larger than that of the gas generator. In an upper side wall area the diffuser or the housing of the gas generator has a smaller cross-section than the gas generator and in this area there are outflow openings for the gases of the gas generator to discharge into the gas bag transversely to the longitudinal axis of the diffuser. The lower and upper side wall areas are connected by at least one central deformable side wall area.

The arrangement according to the invention has the advantage that the section of the diffuser lying above the gas generator can as a result of its deformable central side wall area be shifted by the impact of an occupant away from same so that the risk of injury is reduced. Since the lower side wall area projects upwards beyond the gas generator the adjoining central side wall area also has sufficient room for the deformation in the direction of the gas generator. Owing to the smaller cross section of the diffuser or housing of the gas generator above the gas generator there is still sufficient space above same next to the diffuser or housing in which to store the folded gas bag. The utilization of the structural space available is thereby improved so that the targets set for reducing the geometry of the module can be easily met.

As a result of the openings in the diffuser or housing lying transversely to the longitudinal axis of the diffuser the gases enter into the gas bag crosswise relative to the occupant and a primarily lateral unfolding of the gas bag thus takes place. The gas flow is thereby first directed upwards in the lower side wall area and strikes the central side wall area. One part of the gas flow is diverted towards the outflow openings and the other part is eddied around in the space above the gas generator. The multiple deflection draws energy out from the overall system which has a positive effect on the thermal load on the gas bag fabric and the aggressiveness of the deployment of the gas bag.

The gas flow which is discharged from the outlet openings first forms in the upper module area a bubble from the fabric layer located above the diffuser fabric layer located above the diffuser or housing, with this process being made easier by the low package pressure existing in this area on account of the stepped structure of the diffuser. The bubble then expands laterally through the stepped release of the gas bag package from inside to outside until fully deployed.

Owing to the lateral unfolding the extension of the gas bag in the direction of the occupant is restricted to a minimum. The occupant is thereby not attacked in the normal position and the risk of injury to the occupant in an out of position area is minimized. No arrester straps or rip seams are required for the gas bag. Furthermore vibrations in the gas bag are reduced so that the gas bag occupies its optimum position for the protection of the occupant at an earlier moment.

The deformability of the central side wall area is preferably achieved by providing material weaknesses, more particularly in the forms of slits, in this area. These slits thereby have a width of at least approximately zero millimeters so that they primarily represent no outlet openings for the gases of the gas generator. In the case of a diffuser having a circular cross-section the slits preferably run radially.

It is expedient if the upper side wall area has a height which is less than half the height of the airbag module. Furthermore it is expedient if the upper edge of the diffuser or housing of the gas generator extends practically up to the module cover. The upper side wall area preferably has a cylindrical or conical shape.

The gas bag is preferably arranged around the diffuser and only one layer of the gas bag is located above the diffuser.

In one embodiment preliminary outlet openings are provided in the lower side wall area of the diffuser or housing of the gas generator to influence the pressure path. The preliminary outlet openings are preferably arranged so that they do not overlap with the outlet openings of the gas generator. They can be arranged for example above the outlet openings of the gas generator. The overall cross-sectional area of the preliminary outlet openings should be smaller than the overall cross-sectional area of the outlet openings of the gas generator. In one embodiment four preliminary outlet openings are provided.

The invention will now be explained with reference to the embodiments shown in the drawings in which.

Figure 1:
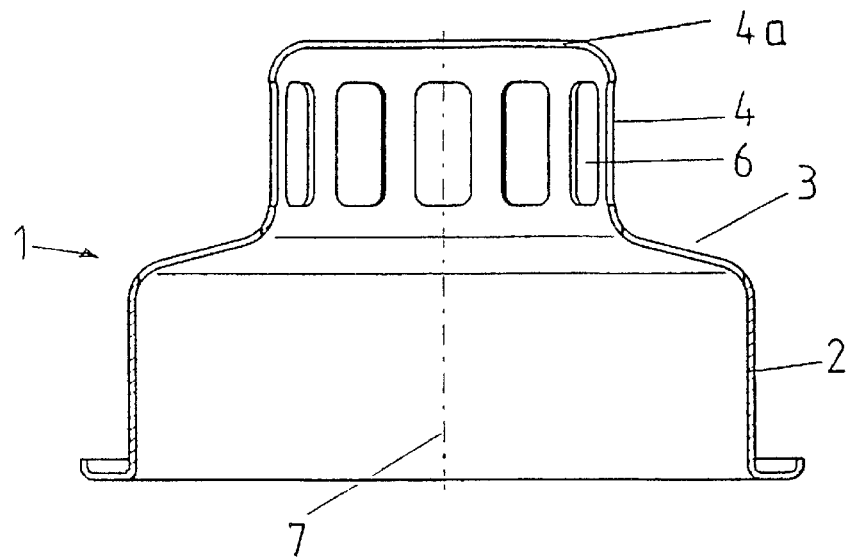
FIG. 1 is a longitudinal sectional view through a stepped diffuser.
Figure 2:
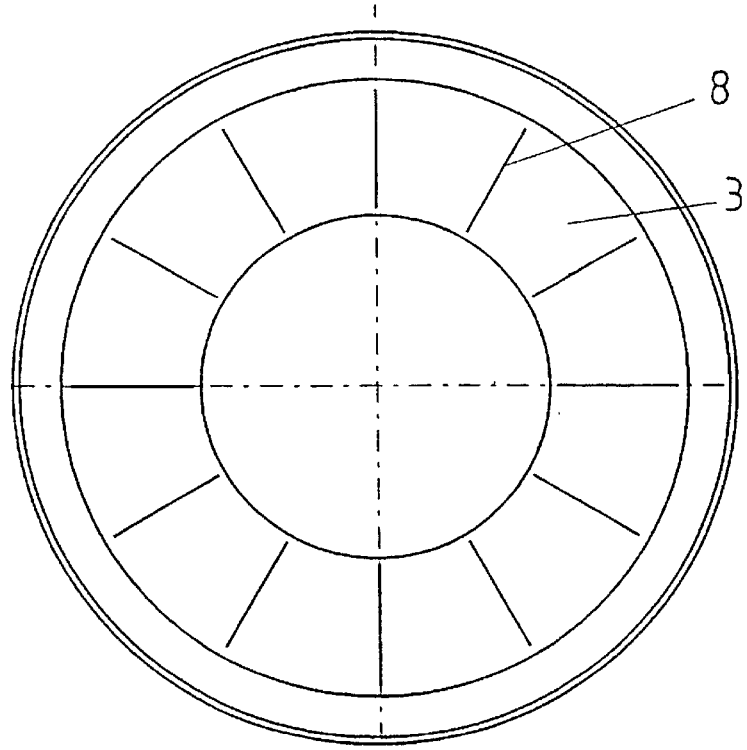
FIG. 2 is a plan view of the diffuser according to FIG. 1.
Figure 3:
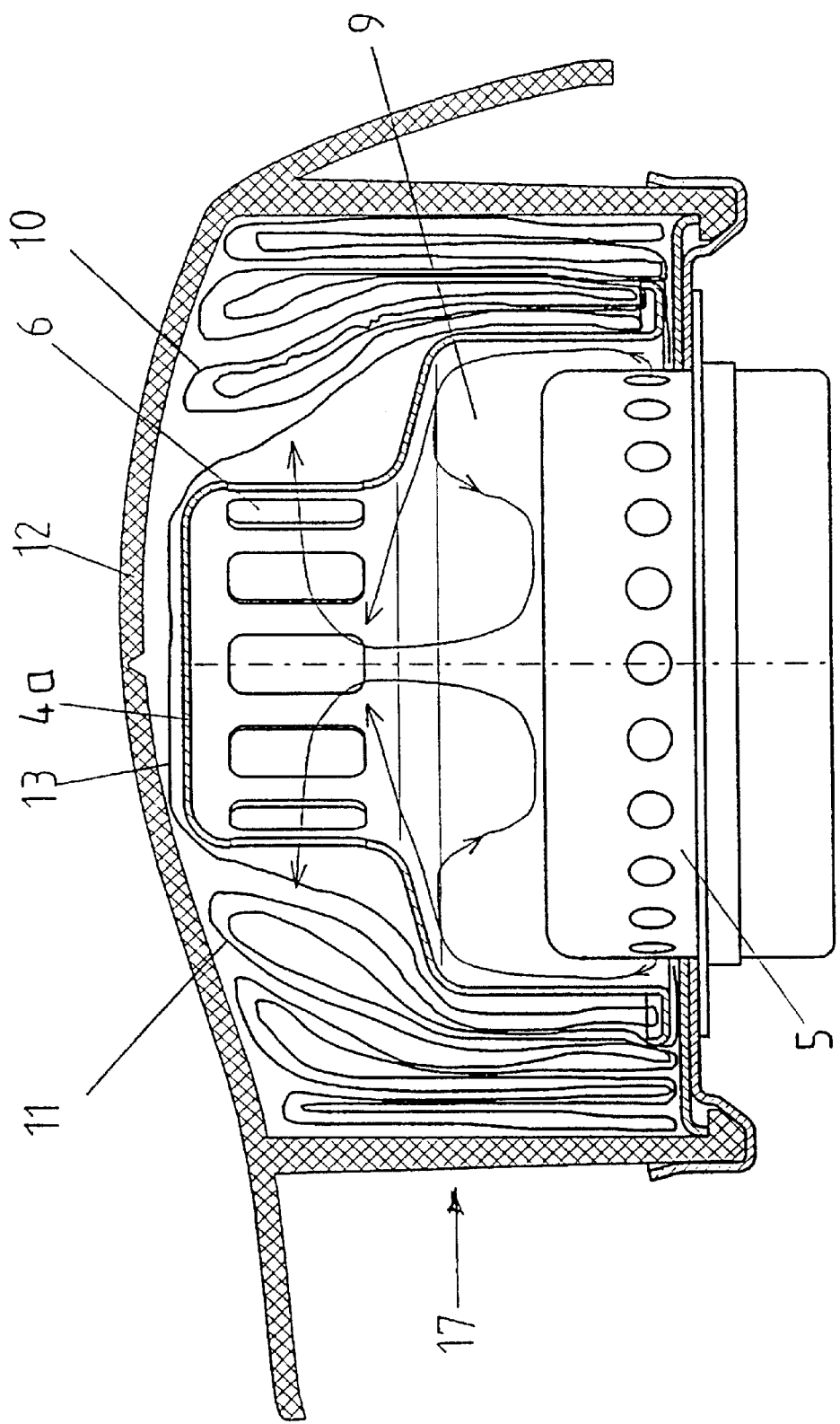
FIG. 3 is a longitudinal sectional view through an airbag module with a diffuser according to FIG. 1.

FIG. 1 shows a diffuser which has a lower side wall area 2, a central side wall area 3 and an upper side wall area 4 with an upper edge 4a. The lower side wall area 2 encloses a space whose cross-sectional area is larger than that of a gas generator 5 mounted therein and extends beyond same towards the occupant (FIG. 3). The upper side wall area 4 has a clearly smaller cross-section than the gas generator 5 and is provided with oblong outlet openings 6. The central side wall area 3 connects the lower side wall area to the upper side wall area and runs sharply inclined relative to the longitudinal axis 7 of the diffuser 1. This side wall area 3 has radially arranged slits 8 whose width has a tendency to zero so that these slits represent no outlet openings for the gas discharging from the gas generator. As a result of the slits 8 this side wall area 3 is deliberately weakened so that in the event of an occupant impacting against the diffuser the wall can deform towards the gas generator. Since the central side wall area 3 lies at a distance above the gas generator 5, with this distance amounting to several centimeters, a space 9 is provided between the two into which the central side wall area 3 can deform (FIG. 3).

As can be seen from FIG. 3, owing to the stepped construction of the diffuser 1 and the thus smaller cross-section of the diffuser in the area of the upper side wall 4 compared to the gas generator 5 a folded gas bag 10 can lie at least in part more or less above the gas generator 5 without the drawbacks which arise during unfolding which normally occur in the case of a gas bag folded over the gas generator. The gas bag 10 is mounted inside the module cover 12 with the folds 11 aligned in the direction of the occupant. Only one layer 13 of the gas bag 10 is located above the diffuser, formed in the case of a gas bag comprising an upper part and lower part, by the said upper part.

After ignition of the gas generator 5 the gas stream discharged from same is directed upwards at the lower side wall area 2 and strikes the central side wall area 3. One part of the gas flow is diverted there towards the outflow openings 6 whilst another part is eddied around in the space 9 above the gas generator. AS a result of this vortex a part of the energy of the gas flow is broken down so that the thermal load on the gas bag fabric is reduced and the gas bag deploys less aggressively. The path of the gases is marked by the arrows in FIG. 3.

Figure 4:
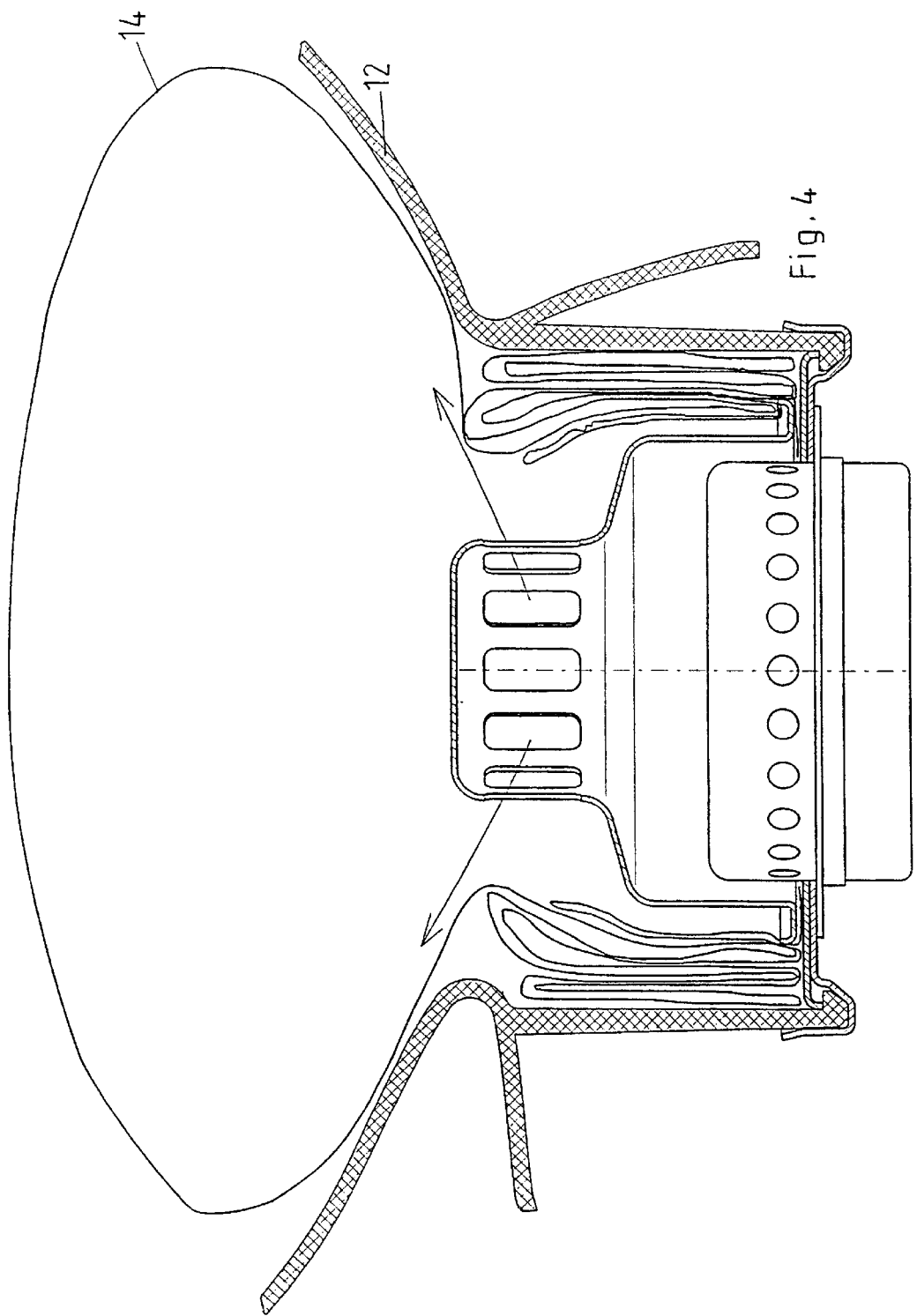
FIG. 4 shows the airbag module according to FIG. 3 with a partially unfolded gas bag.

The gas flow leaves the diffuser 1 in the radial direction and initially forms in the upper module area a bubble 14 from the layer 13 of the gas bag 10 lying above the diffuser 1. This process is facilitated by the lower package pressure existing in this area as a result of the stepped diffuser. In this first phase of deployment the module cover 12 of the airbag module 17 is ripped open by the bubble 14. The bubble 14 then expands laterally through the stepped release of the gas bag package from inside outwards (FIG. 4) until fully unfolded.

Figure 5:
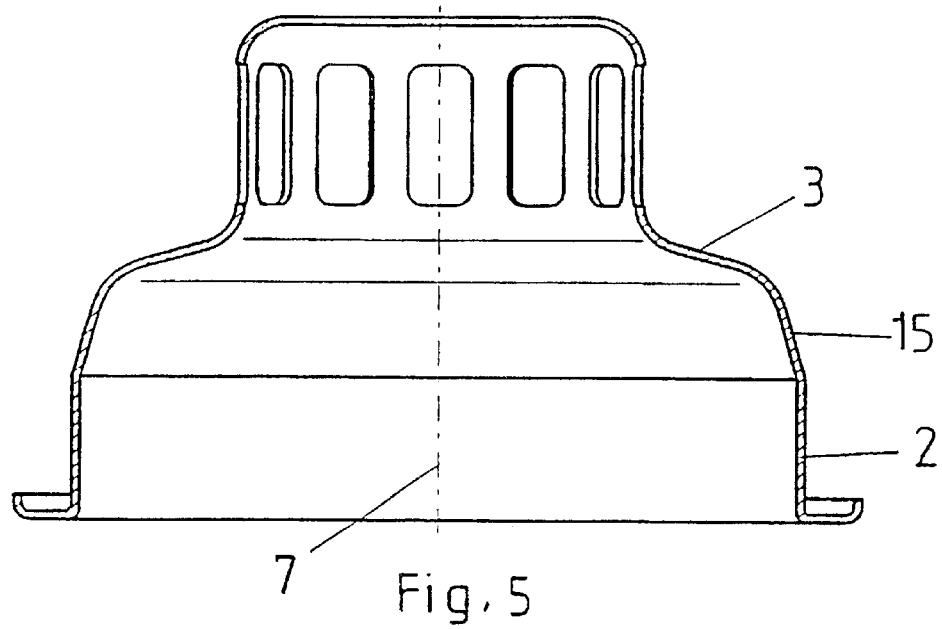
FIG. 5 shows a longitudinal sectional view through a second embodiment of the diffuser.

A further embodiment of the diffuser is shown in FIG. 5 in which the lower side wall area 2 has an upper section 15 which is inclined only slightly relative to the longitudinal axis 7 of the diffuser. This section is then adjoined by the central side wall area 3.

Figure 6:
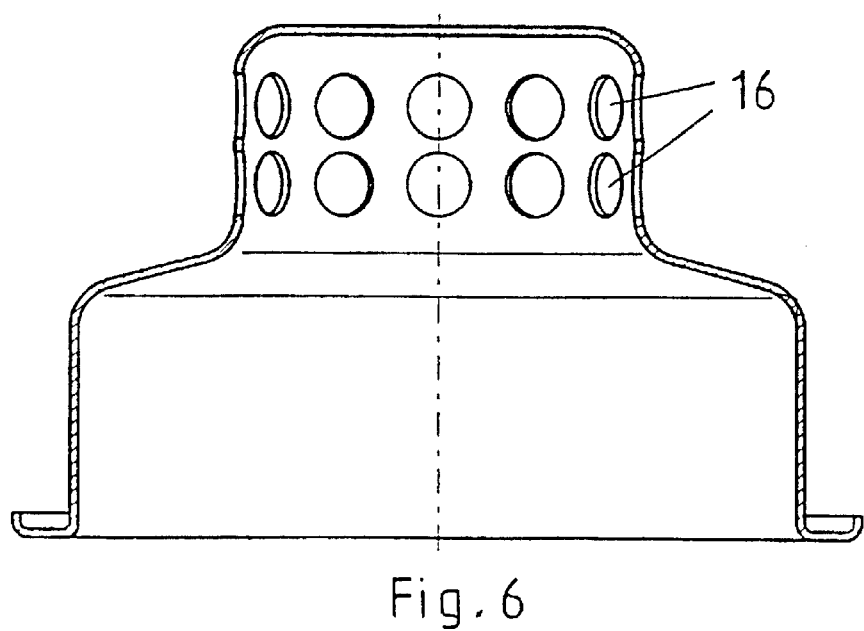
FIG. 6 shows a longitudinal sectional view through a third embodiment of the diffuser.

FIG. 6 shows a stepped diffuser in which instead of the oblong outflow openings of the embodiments previously described there are two rows of superposed circular outflow openings 16.

Figure 7:
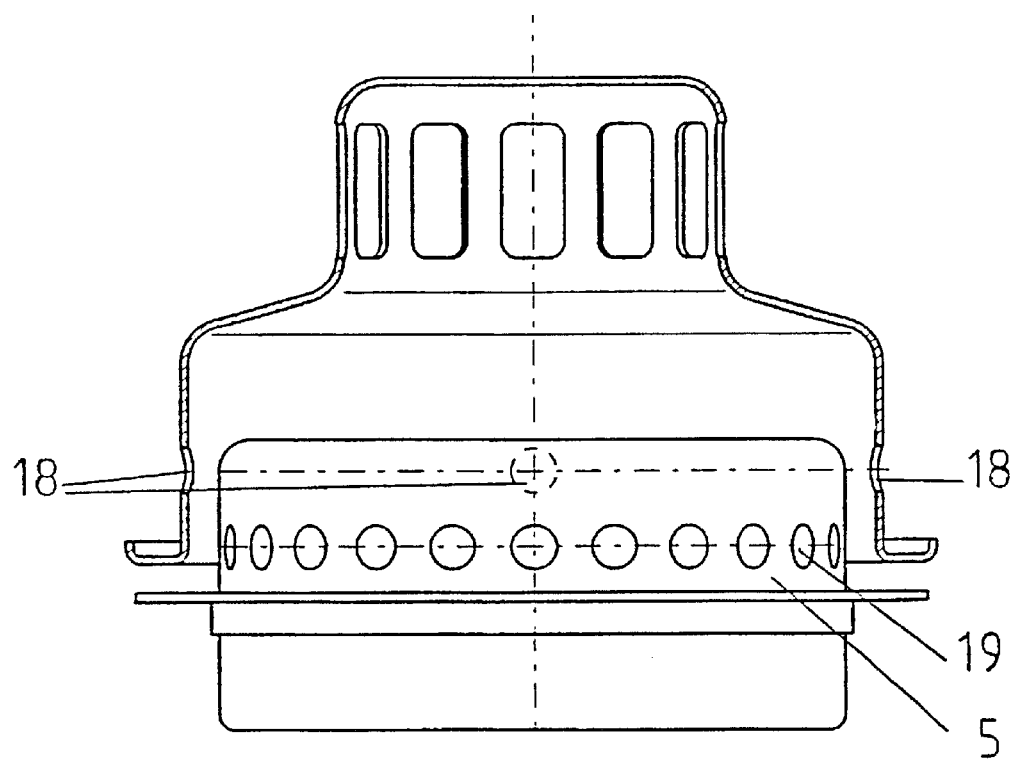
FIG. 7 shows a longitudinal sectional view through an airbag module with a diffuser having preliminary outlet openings.

In FIG. 7 an airbag module is illustrated in which the diffuser has four preliminary outflow openings 18 which are arranged above the outflow openings 19 of the gas generator 5, i.e. these outflow openings and the preliminary outflow openings do not overlap each other. The pressure path in the gas bag can be additionally influenced by means of these preliminary outflow openings 18.

What is claimed is:

1. Airbag module having a gas bag, gas generator and a module cover having a tear-open area is arranged above the gas generator wherein the gas generator is mounted essentially coaxially in a diffuser which encloses the gas generator and is provided with outflow openings, and the diffuser extends in a side wall area at a distance from the gas generator, the side wall area thereby extends beyond the gas generator upwards towards the tear-open area of the module cover and encloses at least substantially the same cross-section as a side wall area adjacent the gas generator;

wherein the diffuser has a stepped construction with a lower side wall area, an upper side wall area and a central side wall area which connects the upper wide wall area and the lower side wall area and which defines a step therebetween, wherein the lower side wall area extends a distance from the gas generator and beyond the gas generator towards the tear-open area of the module cover, the diffuser has in an upper side wall area a smaller cross-sectional surface than the gas generator and in this area the outflow openings are provided for the gases of the gas generator to discharge into the gas bag transversely to a longitudinal axis of the diffuser, and wherein the central side wall area is deformable relative to the upper side wall and the lower side wall.

2. Airbag module according to claim 1 wherein the central side wall area has material weaknesses.

3. Airbag module according to claim 1 wherein the upper side wall area has a height which is less than half the height of the airbag module.

4. Airbag module according to claim 1 wherein the upper side wall area runs cylindrical.

5. Airbag module according to claim 1 wherein an upper edge of the diffuser extends practically up to the module cover.

6. Airbag module according to claim 1 wherein the gas bag is arranged around the diffuser so that only one layer of the gas bag is located above the diffuser.

7. Airbag module according to claim 1 wherein preliminary outflow openings are provided in the lower side wall area of the diffuser.

8. Airbag module according to claim 7 wherein the preliminary outflow openings are arranged so that there is no overlap with outflow openings of the gas generator.

9. Airbag module according to claim 7 wherein the preliminary outflow openings are provided above the outflow openings of the gas generator.

10. Airbag module according to claim 7 wherein the overall cross-sectional area of the preliminary outflow openings is smaller than the overall cross-sectional area of outflow openings of the gas generator.

11. Airbag module according to claim 7 wherein four preliminary outflow openings are provided.

12. The airbag module of claim 1, further comprising slits positioned in the central side wall area to allow for deformation of the central side wall.

13. The airbag module of claim 1, further comprising preliminary gas outflow openings located in the lower side wall area of the diffuser.

14. The airbag module of claim 13, wherein the cross-sectional area of the preliminary gas outflow openings is less than the cross-sectional area of the outflow openings.

15. Airbag module according to claim 1 wherein the central wall area is formed with a plurality of portions which are reduced in structural rigidity and which render the central side wall area deformable.

16. Airbag module having a gas bag, gas generator and a module cover having a tear-open area is arranged above the gas generator wherein:

the gas generator is mounted in a diffuser which encloses the gas generator and is provided with outflow openings, and the diffuser extends in a side wall area at a distance from the gas generator, the side wall area thereby extends beyond the gas generator upwards towards the tear-open area of the module cover and encloses at least substantially the same cross-section along the side wall area adjacent the gas generator, wherein the diffuser has a stepped construction with a lower side wall area, an upper side wall area and a central side wall area which connects the upper wide wall area and the lower side wall area, wherein the lower side wall area extends a distance from the gas generator and beyond the gas generator towards the tear-open area of the module cover, the diffuser has in an upper side wall area a smaller cross-sectional surface than the gas generator and in this area the outflow openings are provided for the gases of the gas generator to discharge into the gas bag transversely to a longitudinal axis of the diffuser, wherein the central side wall area is deformable, wherein the central side wall area has material weaknesses, and wherein the central side wall area has slits as the material weaknesses.

17. Airbag module according to claim 16 wherein the slits have a width of approximately zero millimeters.

18. Airbag module according to claim 16 wherein the slits run radially across a circular cross-section of the diffuser.

19. An airbag module comprising:

an airbag;

a gas generator mounted essentially coaxially in a diffuser having outflow openings to allow gas to flow into the airbag;

a module cover having a tear-open area to accommodate the airbag during inflation;

wherein the diffuser has a generally stepped construction extending toward the tear-open area of the module cover and includes a lower side wall, an upper side wall including the outflow openings positioned to discharge gas in a direction generally transverse to the upper and lower side walls, a deformable central side wall which is connected between the upper and lower side walls and which defines a stepped portion separating the upper side wall and the lower side wall, and wherein the upper side wall has a smaller cross-sectional area than the gas generator.

20. The airbag module of claim 19, wherein the upper side wall includes an upper edge forming a top surface of the diffuser and the module being configured so that prior to inflation the airbag is folded so that only one layer of the airbag overlies the upper edge.

21. Airbag module as set forth in claim 18, wherein the upper side wall is essentially coaxial with the lower side wall.

22. Airbag module as set forth in claim 21, wherein the gas generator is arranged essentially coaxially with the upper side wall and the lower side wall.

23. Airbag module as set forth in claim 19, wherein the cross section of the upper side wall is essentially circular and the cross section of the lower side wall is essentially circular.

24. Airbag module as set forth in claim 19, wherein the upper side wall is essentially cylindrical, the lower side wall is essentially cylindrical, and the lower side wall has a radially extending flange formed thereon.

25. An airbag module comprising:

a diffuser having a lower essentially cylindrical wall;

a gas generator partly enclosed by the lower wall;

an upper essentially cylindrical wall which is essentially coaxial with the lower wall and which has a diameter less than that of the portion of gas generator enclosed by the lower wall; and a deformable wall portion having a structure which reduces its resistance to deformation with respect to the upper and lower walls and which allows the upper wall to be displaced toward the lower wall upon the application of a predetermined amount force.

26. An airbag module as set forth in claim 25, wherein the deformable wall portion includes a plurality of slits which have an essentially zero width.

* * * * *